United States Patent [19]

Kuramoto et al.

[11] 4,337,996

[45] Jul. 6, 1982

[54] LENS MOUNT SUPPORT FOR SELF-EXTENDING CAMERA

[75] Inventors: Yoshio Kuramoto, Toyonaka; Hiroshi Ueda, Nara; Masatoshi Itoh, Sakai, all of Japan

[73] Assignee: Minolta Camera Kabushiki Kaisha, Osaka, Japan

[21] Appl. No.: 86,898

[22] Filed: Oct. 22, 1979

[30] Foreign Application Priority Data

Oct. 26, 1978 [JP] Japan .................................. 53-132286

[51] Int. Cl.³ .......................... G02B 7/22; G03B 17/04
[52] U.S. Cl. ..................................... 350/255; 354/194
[58] Field of Search ....................... 350/255, 257, 319; 354/194, 191, 198

[56] References Cited

U.S. PATENT DOCUMENTS

| | | | |
|---|---|---|---|
| 434,046 | 8/1890 | Hutchins | 354/194 |
| 598,569 | 2/1898 | Meyer | 354/194 |
| 1,150,814 | 8/1915 | Dietz | 354/198 |
| 1,928,983 | 10/1933 | Schaer | 354/187 |
| 4,128,323 | 12/1978 | Wick et al. | 354/187 |
| 4,205,895 | 6/1980 | Yurdin et al. | 350/60 |

FOREIGN PATENT DOCUMENTS 423634 4/1911 France .............................. 354/194

OTHER PUBLICATIONS

The Minolta Manual, Cooper, 1959, pp. 128-130.

*Primary Examiner*—Jon W. Henry

[57] ABSTRACT

An objective lens extension device for use with a camera having an interchangeable lens coupling includes front and rear mounts having confronting recesses which form a housing when together, the rear mount having a camera coupling and the front mount having a lens coupling similar to the camera lens coupling and complimenting and rear mount camera coupling. A bellows extends between the mounts coaxial with the mount couplings and a pair of similar longitudinally extending linearly extendable contractable link assemblies, for example of the lazy tongs type, extend between and are connected to the mounts and lie in mutually perpendicular planes. A third link assembly may be provided parallel and similar to one of the others. The link assemblies may be spring biased to a contracted condition, releasably locked in preselected conditions and transversely stressed to frictionally retard their movement. In the bellows and link assemblies contracted condition they are enclosed in the housing formed by the contracted mounts.

14 Claims, 10 Drawing Figures

LENS MOUNT SUPPORT FOR SELF-EXTENDING CAMERA

BACKGROUND OF THE INVENTION

The present invention relates generally to improvements in camera devices and it relates particularly to an improved lens mount support linkage for use in a self-extending camera or a closeup bellows mountable to a camera of the interchangeable lens type.

Heretofore, proposed closeup bellows of the type which is detachably mounted to cameras are provided with a lens mount or housing to which an interchangeable objective lens is mounted and which is axially moved along a guiderail by a rack and pinion drive system so that the optical axis of the objective lens mounted to the lens mount and the photographic axis of the camera body are aligned with each other. Furthermore, some of these bellows are of a type in which a guiderail is folded back after the bellows has been completely contracted so that the entire bellows device is collapsed to a compact condition while not in use, thereby being convenient to store and carry. However, bellows of this type pose many problems in that the guiderail is externally disposed even after the bellows has been contracted, resulting in highly reduced carrying and handling convenience, and in that the rack portion provided on the guiderail is easily damaged if struck against an object. In addition, the guiderail cannot be folded back with an interchangeable lens in mounted position even when the bellows is fully contracted.

SUMMARY OF THE INVENTION

Accordingly, it is a primary object of the present invention to provide an improved linkage for extendably supporting an interchangeable objective lens which is coupled to a camera body by a bellows without any deviation from the optical axis of the camera.

Another object of the present invention is to provide an improved extendable support linkage for use with an interchangeable lens coupling bellows which can be collapsed into an extremely compact size even with the interchangeable objective lens being coupled to the bellows.

The above and other objects of the present invention will become apparent from a reading of the following description taking in conjunction with the accompanying drawings which illustrate preferred embodiments thereof.

A device according to the present invention comprises longitudinally spaced front and rear parallel mounts respectively including an interchangeable lens coupling and a camera coupling, a bellows extending between the mounts coaxial with the couplings and providing light tight communication therebetween and a pair of similar linearly extendable contractable link assemblies extending longitudinally between and connected to the mounts and lying in mutually perpendicular planes so that the mounts are movable toward and away from each other along a linear axis without deviation therefrom and while maintaining mutually parallel orientations. A third similar link assembly may be provided parallel to one of the other link assemblies. Advantageously, the mounts have confronting cavities which form a housing enclosing the collapsed bellows and link assemblies, a spring biases the link assemblies to a contracted condition, a locking mechanism releasably locks the link assemblies in a preset condition and the link assemblies are transversely stressed to frictionally retard their extension or contraction.

The improved lens extension device is highly reliable and accurate, easy and convenient to operate and collapsible to a highly compact condition to facilitate its handling and storing.

DESCRIPTION OF THE PREFERRED EMBODIMENTS

Figure 1:
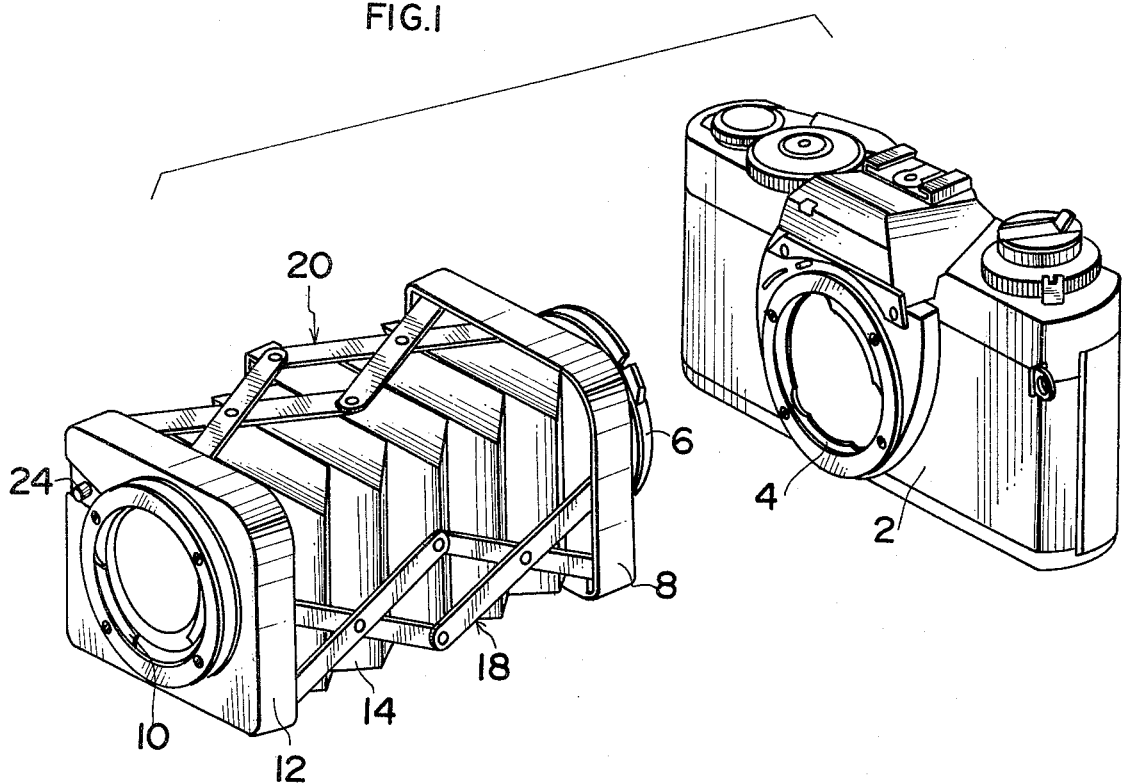
FIG. 1 is a perspective view of a bellows device embodying the present invention shown in an extended position and an associated camera body detached from the bellows device.

Referring now to the accompanying drawings, particularly FIGS. 1 through 6 thereof which illustrate a preferred embodiment of the present invention as employed with a single lens reflex camera body, the improved bellows device comprises a camera mount or housing 8 provided with a mount coupling 6 separably connected to the lens mount coupling 4 of a camera body 2, lens support mount or housing 12 provided with a mount coupling 10, identical in construction to mount coupling 4 of camera body 2, for mounting an interchangeable objective lens, a collapsible bellows 14 interconnecting housings 8 and 12 in a light tight manner for establishing a light tight chamber between them, and a linkage consisting of three link assemblies 18, 20 and 22 which are respectively extendable and contractable to move the lens support housing 12 in constant parallel relation to camera mount housing 8 without deviation from the optical axis, each link assembly 18, 20 and 22 being broadly of the straight line linkage type and specifically lazy tong linkages.

Figure 2:
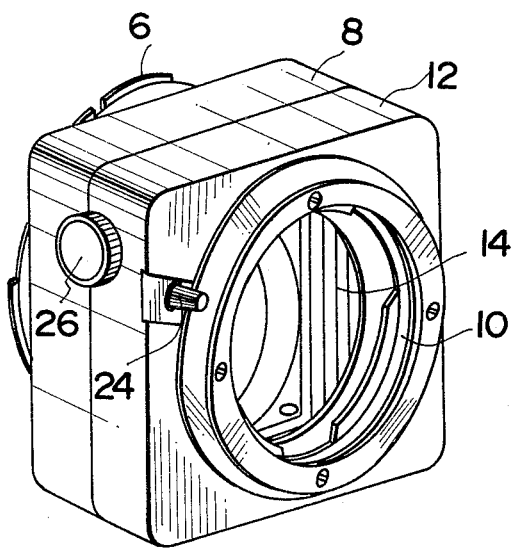
FIG. 2 is a perspective view of the bellows device shown in a fully contracted condition.

As shown in FIG. 2, the bellows 14 and link assemblies 18, 20 and 22 are almost completely enclosed and concealed within a box formed by a pair of hollow portions respectively provided on the camera mount housing 8 and lens support housing 12 when collapsed. Located externally under this collapsed enclosing condition are only mount coupling 6 for coupling to a camera body, mount coupling 10 for mounting an interchangeable objective lens, a lens release button 24 and a lock knob 26 for locking the linkage to maintain bellow 14 at any desired extended position. The collapsed bellows device is highly compact with no large projecting portions, resulting in a convenient shape which can be easily inserted into a bag or the like.

Figure 3:
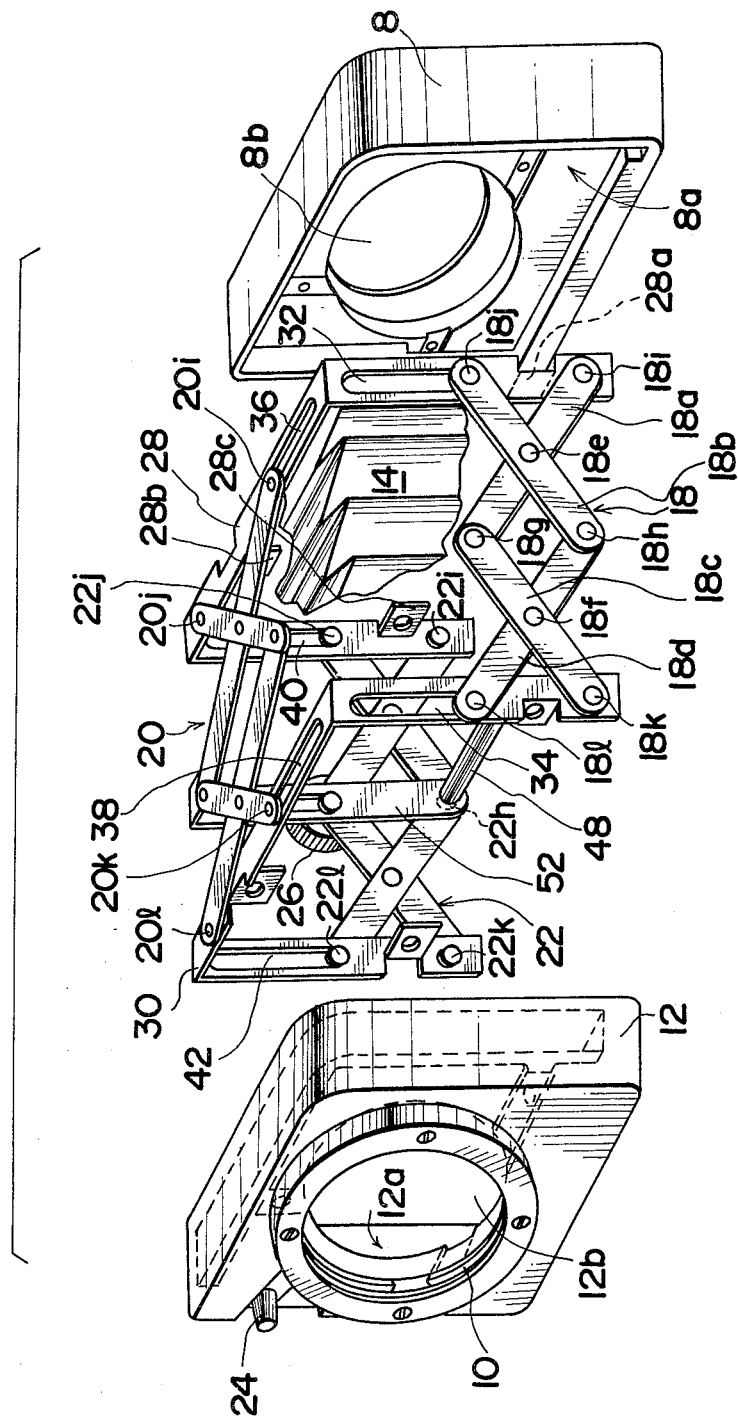
FIG. 3 is a partially fragmented perspective exploded view of the bellows device.

As best seen in FIG. 3, the link assembly 18 provided on the right hand side of the bellows is of lazy tong construction and consists of 4 link bars 18a, 18b, 18c and 18d which are of equal length. Link bars 18a and 18b, and the link bars 18c and 18d are rotatably or pivotally connected at their respective centers by pins 18e and 18f, respectively. Furthermore, the front end of link bar 18a and the rear end of link bar 18c, and the front end of link bar 18b and the rear end of link bar 18d are rotatably or pivotally connected by pins 18g and 18h, respectively. This allows link assembly 18 to extend or contract along or parallel to a common plane or axis at all times. Link assembly 18 thus constructed, is connected at its opposite ends to U-shaped frames 28 and 30. Formed in each right side leg, top side cross leg and left side leg of U-shaped frame 28 are elongated slots 32, 36 and 40 for slidably engaging the rear end of one rear link of each link assembly. Similarly formed on each of the right side, top side and left side legs of frame 30 are elongated slots 34, 38 and 42 respectively which slidably engage the front end of one front link of each link assembly. The rear end of link bar 18a of link assembly 18 is rotatably or pivotally mounted on the right side leg of U-shaped frame 28 by a pin 18i and the rear end of link bar 18b is slidably coupled to elongated slot 32 by a pin 18j. Moreover, the front end of link bar 18c is rotatably or pivotally connected to the right side leg of U-shaped frame 30 by a pin 18k and the front end of link bar 18d is slidably connected to elongated slot 34 by a pin 18l. The right side leg of U-shaped frame 30 and the right side leg of U-shaped frame 28 are always mutually parallel with each other as they are relatively moved by means of link assembly 18.

Link assembly 20 is likewise of lazy tong construction and comprises four link bars of lengths equal to those of link assembly 18 and connected in a manner similar to that in link assembly 18. The rear end of link assembly 20 is connected to the top cross-leg of U-shaped frame 28 by a fixed pivotally supporting pin 20j and by a pin 20i which slidably engages an elongated slot 36 in the top leg. Furthermore, the front end of link assembly 20 is connected to the top cross-leg of U-shaped frame 30 by a fixed pivotally supporting pin 20l and a pivot pin 20k which slidably engages an elongated slot 38 in the top leg. Thus, link assembly 20 can extend or contract along or parallel to a plane which is substantially normal or perpendicular to the plane along which the link assembly 18 moves. As a result, the top leg of U-shaped frame 28 and the top leg of U-shaped frame 30 are maintained parallel with each other as they are moved toward or away from each other.

Link assembly 22 also comprises four link bars equal in length to those constituting link assembly 18 and connected in a similar manner as in link assembly 18. As in link assemblies 18 and 20, the rear end of link assembly 22 is connected to the left leg of U-shaped frame 28 by a fixed pivot support pin 22i and by pin 22j which slidably engages elongated slot 40, and the front end thereof is connected to the left leg of U-shaped frame 30 by a fixed pivot support pin 22k and pin 22l which slidably engages an elongated slot 42. Thus, link assembly 22 can extend or contract along or parallel to a plane which is substantially parallel to the plane along which the link assembly moves. This results in a parallel movement at all times of the left leg of U-shaped frame 28 and the left leg of U-shaped frame 30.

The three link assemblies 18, 20 and 22 maintain the legs of U-shaped frame 28 parallel with the corresponding legs of U-shaped frame 30 at all times, whereby U-shaped frames 28 and 30 are always maintained parallel to each other as they are moved toward and away from each other. Furthermore, the two link assemblies 18 and 22 are provided in parallel with each other and positioned perpendicular to the link assembly 20 and along bellows 14 thereby preventing the U-shaped frames 28 and 30 from vertically deviating. In addition, link assembly 20 is provided horizontal and parallel to the top surface of the bellows and normal to each of the link assemblies 18 and 22 thereby preventing the U-shaped frames 28 and 30 from horizontally deviating.

Thus, the two U-shaped frames 28 and 30 remain always undeviated and perpendicular in relation to an optical axis.

Pivot support pin 18h located at center bottom of link assembly 18 and connecting links 18b and 18d and the pivot support pin 22h corresponding to pin 18h in link assembly 22 are coupled to each other by a reinforcing or cross bar 48. Reinforcing bar 48 is slightly shorter in dimension than the space between link assemblies 18 and 22. Therefore, when installed, reinforcing bar 48 causes the central portions of link assemblies 18 and 22 to be forcibly bent inwardly although they are provided in parallel with each other. As a result, the connection of each link bar increases in friction, thereby causing link assemblies 18 and 22 not to be inadvertently or undesirably extended or contracted. It should be noted, that the reinforcing or cross bar produces a similar effect even when made longer than the space between link assemblies 18 and 22.

Camera mount housing 8 consists of a shallow box having a hollow portion 8a to the rear of which coupling or mount 6 which is separably attachable to the camera body is affixed, and an opening 8b is formed to match the circular opening formed in mount 6. U-shaped frame 28 is fixed to camera mount housing 8 by means of tab portions 28a, 28b, and 28c integrally provided on the frame legs and fixedly connected to the bottom of hollow portion 8a by screws (not shown).

On the other hand, lens support housing 12 consists of a shallow box having a hollow portion 12a confronting with hollow portion 8a and an opening 12b is formed to match a circular opening formed in coupling mount 10. U-shaped frame 30 is fixed to lens support housing 12 in a similar manner as shown in connection to the frame 28.

As a result, camera mount housing 8 and lens support housing 12 are connected through U-shaped frames 28 and 30 and link assemblies 18, 20 and 22 to each other, both housings being moved in parallel with each other at all times.

Furthermore, the rear end of bellows 14 is screw-fixed to the base or end face of hollow portion 8a of camera mount housing 8, while the front end of bellows 14 is screw-fixed to the base or inner end face of hollow portion 12a of lens support housing 12.

Bellows 14 is positioned inside a space of square transverse cross section delineated by link assemblies 18, 20 and 22, U-shaped frames 28 and 30 and reinforcing bar 48, and establishing a light tight chamber between camera mount housing 8 and lens support housing 12, more specifically between mount 10 and mount 6. Bellows 14 is extensible and contractable in response to the back and forth movements of lens support housing 12.

Figure 4:
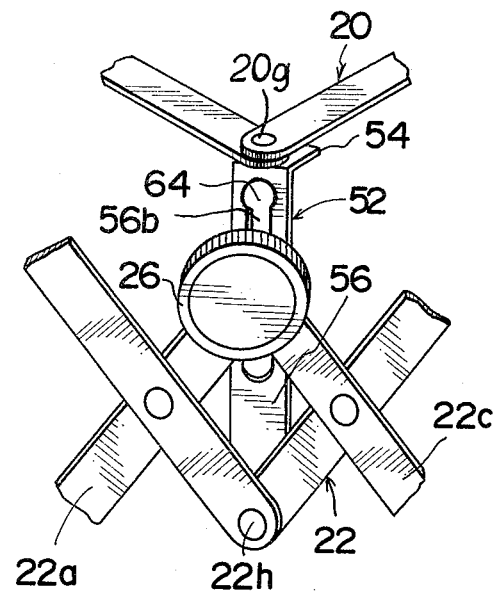
FIG. 4 is a fragmented perspective view of the locking portion of the bellows device.
Figure 5:
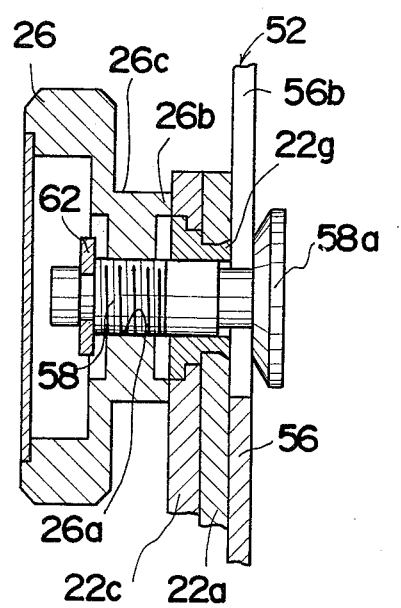
FIG. 5 is a vertical medial sectional view of the locking portion shown in released condition.
Figure 6:
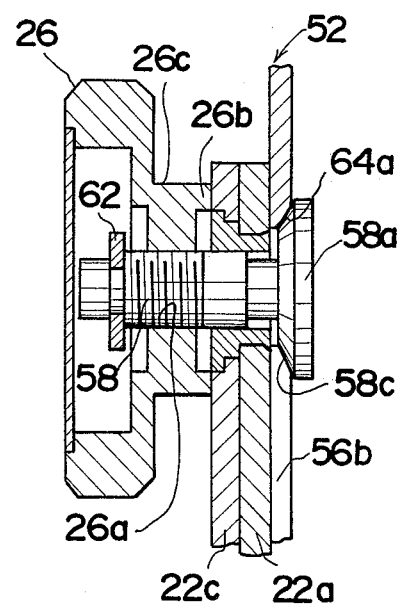
FIG. 6 is a view similar to FIG. 5, but shown in locked condition.

Link assembly 22 is provided with a locking mechanism in order to prevent any undesirable extention or contraction thereof, being best seen in FIGS. 4 through 6. The locking mechanism includes an inverted L-shaped lock member 52 which is rotatably or pivotally mounted to link assembly 20 by pivot support pin 20g which rotatably or pivotally connects two link bars of link assembly 20 and the short horizontal first arm 54 of member 52. The lock member vertical second arm 56 is pivotally and rotatably mounted to link assembly 22 by pivot support pin 22h which rotatably connects two link bars of link assembly 22 and the lower end of arm 56. Furthermore, an elongated slot 56b is formed in arm 56 and a lock screw 58 to be hereinafter described slidably engages elongated slot 56b.

As seen in FIG. 5, L-shaped lock member 52 and link bars 22a and 22c of link assembly 22 overlap with each other link bars 22a and 22c being rotatably coupled to each other by a collar 22g. Lock screw 58 is provided with a head 58a which engages L-shaped lock member 52, and lock screw 58 passes through elongated slot 56b in L-shaped lock member 52 and the axial bore in collar 22g, and is slidable along the axis of the bore and slot. Moreover, lock screw 58 is vertically slidable along elongated slot 56b of L-shaped lock member 52. Lock screw 58 passes through elongated slot 56b and the bore of collar 22g and engages the tapped axial bore 26a of a lock knob 26. Furthermore, a split ring 62 engages the outer end of lock screw 58 so that lock screw 58 is prevented from separating from female screw 26a of lock knob 26. The inner annular border 26b of lock knob 26 averts collar 22g and abuts on the surface of link bar 22c around collar 22g. When lock knob 26 is tightened, link bars 22a and 22c and L-shaped lock member 52 are clamped between head 58a of lock screw 58 and annular border 26b of lock knob 26, thereby resulting in no rotation between link bars 22a and 22c and any sliding of lock screw 58 in elongated slot 56b of L-shaped lock member 52 in vertical directions being frictionally blocked. As a result, the bellows is releasably locked against any extension or contraction and is releasably fixed at any predetermined length.

Confronting aligned semi-circular recesses are formed respectively in the confronting edges of the front end of camera mount housing 8 and in the rear end of lens support housing 12 so that when bellows 14 is fully collapsed, the recesses are matched to form a circular hole with which the neck portion 26c of lock knob 26 registers.

Furthermore, the lock mechanism completely locks bellows 14 when the bellows is fully collapsed. The top end of elongated slot 56b in L-shaped lock member 52, where lock screw 58 is positioned in the bellows fully collapsed condition, has a circular hole 64 of greater width than elongated slot 56b, as shown in FIG. 4. Circular hole 64 is bevelled along its edge, forming a slant or tapered surface 64a. On the other hand, the edge of head 58a of lock screw 58 is also bevelled to form a slant or tapered surface 58c. When the bellows is collapsed and lock knob 26 is tightened, the rotation between link bars 22a and 22c is frictionally prevented as explained earlier, and at the same time, slant surface 58c on head 58a of lock screw 58 engages the circular hole 64 of elongated slot 56b, thereby bearing on the slant surface 64a of circular hole 64, whereby the movement of lock screw 58 along elongated slot 56b is completely blocked. As a result, the bellows is relesably locked in its shortest condition.

Considering now the operation and application of the bellows device described above, the bellows in its concealed or fully housed condition as shown in FIG. 2 is mounted to a camera body by intercoupling camera mount 6 with lens mount 4 of the camera body 2, and an interchangeable objective lens is mounted on lens mount 10 of lens support housing 12. Lock knob 26 is then loosened, and bellows 14 is adjusted to its desired length by moving lens support housing 12 back and forth so that an image of an object to be photographed achieves a desired size. During this manipulation, link assemblies 18 and 22 are slightly bent or deformed by reinforcing bar 48 thereby frictionally retarding movement at the connection of each link bar, thus allowing the bellows to be stopped at any desired length without using a lock mechanism, whereby closeup photography is possible. Furthermore, when the camera is required to be employed with the lens right down for duplicating photography and the like, the length of the bellows can be more positively fixed by tightening lock knob 26, thus assuring reliable photography.

Figure 7:
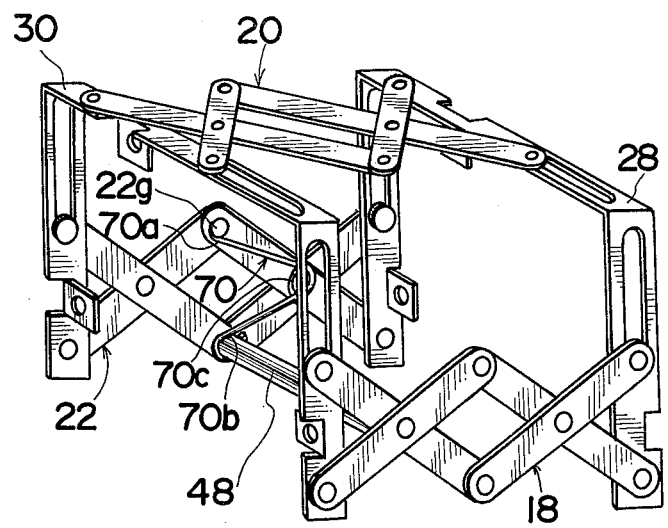
FIG. 7 is a partial perspective view of a modified linkage in accordance with another embodiment of the present invention, which is applicable to the device of FIGS. 1 to 6.

FIG. 7 illustrates the linkage of another embodiment of the present invention in which link assemblies 18, 20 and 22 are provided on the right, top and left sides of the bellows in a manner similar to the embodiment shown in FIGS. 1 through 6. Additionally, a hairpin spring 70 is provided on link assembly 22, with one end 70a engaging collar 22g and the other end, 70b engaging pin 22h or reinforcing bar 48 so that each end portion of the two link bars on which collar 22g and 22h are provided, are urged apart. It should be understood that coil portion 70c of spring 70 is free. The link assembly is thus urged toward its contracted condition, thereby preventing the bellows from inadvertently extending when housed even if a lock mechanism is not provided. Thus, the bellows is spring biased in a direction to normally contract the bellows. In this case, if the force of coil spring 70 is made greater than the friction imparted by reinforcing bar 48, the bellows is urged in its contracting direction and the length of the bellows may be adjusted only by forcibly extending the bellows.

Figure 8:
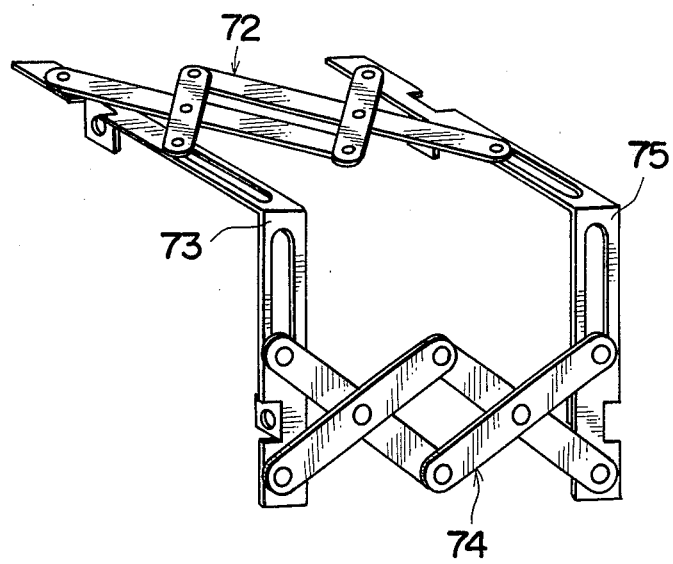
FIG. 8 is a view similar to FIG. 7 of another modified linkage.

Furthermore, the linkage for a bellows as shown in the embodiment illustrated in FIG. 8 may include only two sets of link assemblies connected to the mounts at the top and right sides, for example, by L-shaped frames 73 and 75. In this case, the shifting of the bellows in a horizontal direction is blocked by link assembly 72 provided on the top side, while shifting thereof in a vertical direction is blocked by link assembly 74 provided on the right side.

Figure 9:
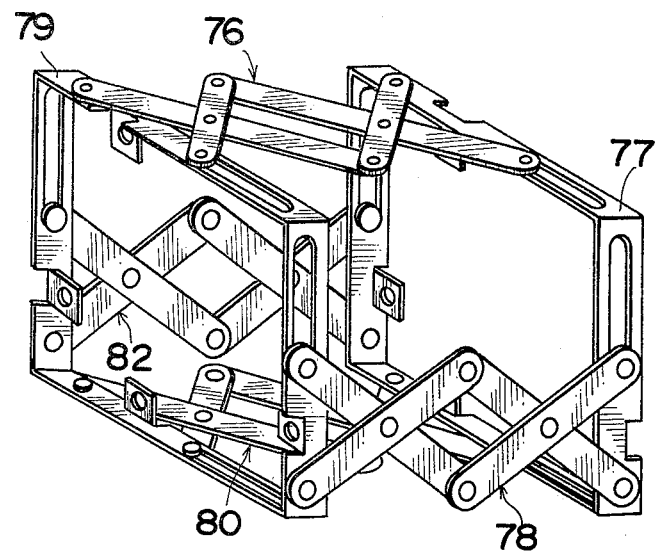
FIG. 9 is a view similar to FIG. 7 of a modified linkage in accordance with a further embodiment of the present invention.

Moreover, as shown in FIG. 9, the linkage may consist of four sets of link assemblies connected to closed or box frames 77 and 79 each having four sides to enclose the bellows along its top, bottom and both sides. With this structure, the bellows is prevented from horizontal shifting and deviating by link assemblies 76 and 80 provided along the top and bottom sides of the bellows and from vertical shifting by link assemblies 78 and 82 provided on the right and left sides. Thus, when lying in horizontal planes, the link assemblies serve to prevent the bellows from shifting or deviating horizontally and when lying in vertical planes, they serve to prevent the bellows from vertically shifting and deviating. With the present embodiment, two sets each of link assemblies are provided in horizontal and vertical planes resulting in a rugged bellows structure. Furthermore, the link assemblies are provided to enclose the bellows along its four sides, ensuring the protection of the bellows from external forces.

Figure 10:
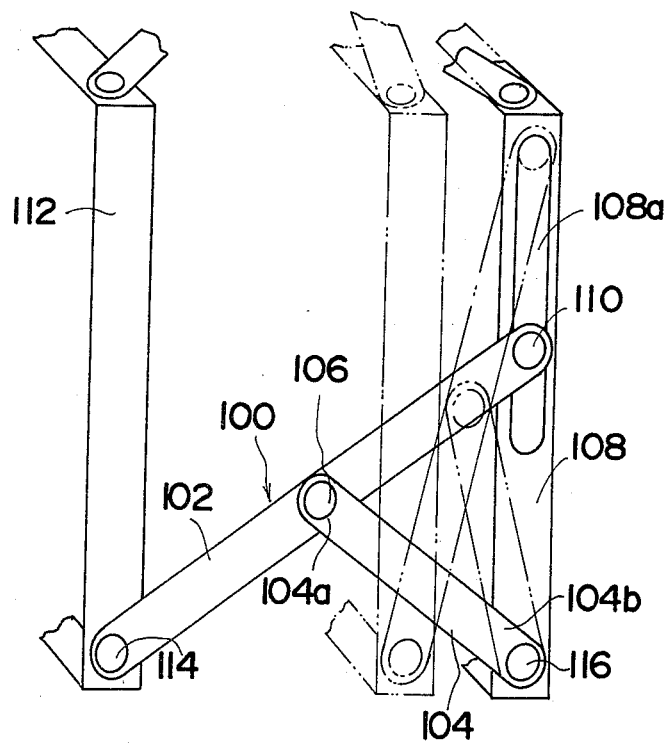
FIG. 10 is a partial perspective view of a modified linkage in accordance with still a further embodiment of the present invention.

In addition, link assemblies provided between a camera mount housing and a lens support housing are not limited to the above pantograph or lazy tongs mechanisms. As shown in FIG. 10, for example, the illustrated mechanism 100 may be utilized. Specifically, one end 104a of a short link bar 104, half the length of a long link bar 102, is rotatably connected by a pivot pin 106 to the center of long link bar 102. The rear end of long link bar 102 is slidably connected to an elongated slot 108a in a leg of rear frame 108 by a pivot pin 110 so that it may be fixed to the camera mount housing. The front end of long link bar 102 is rotatably connected to a leg of front frame 112 to be fixed on the lens, supporting housing by pivot pin 114. The other end 104b of short link bar 104 is rotatably connected to the leg of rear frame 108 by pivot pin 116. This link assembly restricts the pin 114 to move in a straight line linking with pin 116 at all times. Thus, mechanism 100 is used as a link assembly and at least one set each is provided along a vertical plane and another such set along a horizontal plane.

The above linkage structure 100 is connected so as to guide the lens support housing along the optical axis in the protraction and retraction thereof.

According to the present invention, a bellows can be contracted or collapsed into a small size, and includes no excessively projecting portions when contracted, such a bellows being conveniently housed in a bag or the like. In addition, the bellows can be contracted into a small size even when mounted on a camera body and an interchangeable objective lens is mounted on it. At least one link assembly is provided in a horizontal plane and at least one in a vertical plane, whereby the bellows is prevented from rolling or pitching and the long support housing remains undeviated from the optical axis.

In the described embodiment, a box is formed by the camera mount housing and lens support housing when the bellows is collapsed, and when the bellows and link assemblies are housed within the box, the bellows and link assemblies are protected from being damaged by external forces and are also protected from dust.

A lock mechanism, if provided on a bellows, releasably locks the bellows to the desired length for more reliable photography.

A reinforcing or cross bar for forced bending of the link assemblies, if provided on the link assemblies, increases the friction at the connections of the link bars, thereby maintaining the bellows in any adjusted or set position without additional manipulation, whereby the operation of the bellows for photography is simplified. The reinforcing bar also serves to eliminate any play in the link assemblies and U-shaped frames.

In addition, a spring, if provided so that the link assemblies and the bellows are biased towards contraction, makes the bellows more convenient to use, since it does not inadvertently extend when its carried or handled.

While there have been described and illustrated preferred embodiments of the present invention, it is apparent that numerous alterations, additions and omissions may be made without departing from the spirit thereof.

We claim:

1. An extension bellows device detachably mountable on an interchangeable lens camera, comprising:

a camera mount housing to be detachably mounted on said camera;

a lens support housing on which an interchangeable lens is detachably mounted;

a collapsible bellows extending between said camera mount housing and said lens support housing for establishing a light tight chamber between said camera mount housing and said lens support housing;

a support linkage movable between fully extended and fully retracted conditions for movably supporting said lens support housing in parallel relation to said camera mount housing, said support linkage comprising two similar extendable and contractable link assemblies located along two planes substantially normal to each other, each link assembly including a plurality of link bars having overlapping portions movably connected with each other for enabling relative movement of said link bars; and locking means provided on said support linkage for releasably fastening said overlapping portions of said link bars for releasably locking said support linkage in any condition continuously between the linkage fully extended and fully retracted conditions.

2. An extension bellows device as set forth in claim 1 further comprising a biasing means for biasing said support linkage in a linkage contracting direction.

3. An extension bellows device as set forth in claim 1, wherein said support linkage further comprises an auxiliary link assembly similar to said other link assemblies and being parallel to one of said other two link assemblies.

4. An extension bellows device as set forth in claim 1, wherein said lens support housing and camera mount housing are respectively provided with wall portions which establish a chamber in cooperation with each other for housing therein said collapsible bellows and said support linkage when said collapsible bellows and said support linkage are collapsed.

5. An extension bellows device as set forth in claim 1, wherein said link assembly comprises two link bars pivotally connected with each other in crossing relation and said locking means includes a retaining means for retaining respective end portions of said two link bars so as to releasably maintain the distance between said end portions.

6. An extension bellows device as set forth in claim 5, wherein said retaining means includes a lock member having a base portion pivotally supporting the end portion of one of said two link bars and a guide slot, a screw member interconnected to the end portion of the other link bar and projecting through said guide slot and a rotatable knob thread engaging said screw member for clamping said end portion of the other link bar.

7. An extension bellows device as set forth in claim 3, further comprising means for transversely stressing a link assembly so as to frictionally retard its longitudinal movement.

8. An objective lens extension device for use with a camera provided with an interchangeable lens coupling comprising:

a rear mount including a first coupling releasably engageable with said camera lens coupling;

a front mount including a second coupling for releasably engaging an interchangeable lens;

an extendable contractable bellows extending between and secured to said mounts and providing light tight communication between said first and second couplings;

first and second similar, linearly longitudinally extendable contractable link assemblies including rotatably connected link members and extending between and connected to said front and rear mounts and lying in respective planes forming a mutual dihedral angle for maintaining said mounts mutually parallel and restricting their relative movement along a linear longitudinal axis between said mounts between fully extended and fully contracted conditions; and means carried by said link assemblies for releasably locking said link assemblies in any position continuously between their fully extended and fully retracted conditions.

9. The object lens extension device of claim 8 wherein said link assemblies are in mutually perpendicular planes.

10. The objective lens extension device of claim 9 including spring means biasing said link assemblies toward a contracted condition.

11. The objective lens extension device of claim 9 including a third link assembly similar to said first and second link assemblies and parallel to one of said first and second link assemblies and extending between and connected to said front and rear mounts.

12. The objective lens extension device of claim 9 wherein at least one of said mounts has a recess in the face thereof confronting the other mount to form a housing with said other mount in the contracted condition of said bellows and link assemblies to enclose the contracted bellows and link assemblies.

13. An extension bellows device detachably mountable on an interchangeable lens camera, comprising:

a camera mount housing detachably mountable on said camera;

a lens support housing on which an interchangeable lens is mountable;

a collapsible bellows extending between said camera mount housing and said lens support housing for establishing a light tight chamber between said camera mount housing and said lens support housing;

an extendable and contractable support linkage for movably supporting said lens support housing in parallel relation to said camera mount housing, said support linkage comprising two similar extendable and contractable link assemblies located along two planes substantially normal to each other; and locking means for releasably locking said support linkage in a plurality of selected conditions between the linkage fully extended and fully retracted conditions, said camera mount housing and said lens support housing being respectively provided with tetrahedral walls which establish a chamber for housing therein said collapsible bellows and said support linkage when said collapsible bellows and said support linkage are collapsed.

14. An extension bellows device detachably mountable on an interchangeable lens camera, comprising:

a camera mount housing to be detachably mounted on said camera;

a lens support housing on which an interchangeable lens is detachably mounted;

a collapsible bellows extending between said camera mount housing and said lens support housing for establishing a light tight chamber between said camera mount housing and said lens support housing;

an extendable and contractable support linkage for movably supporting said lens support housing in parallel relation to said camera mount housing, said support linkage comprising two similar extendable and contractable link assemblies located along two planes substantially normal to each other;

locking means for releasably locking said support linkage in a plurality of conditions between the linkage fully extended and fully retracted conditions; and a biasing means for biasing said support linkage in a linkage contracting direction.

* * * * *